US011558592B1

(12) United States Patent
Yu et al.

(10) Patent No.: US 11,558,592 B1
(45) Date of Patent: Jan. 17, 2023

(54) DETECTION OF FALSE COLOR IN AN IMAGE

(71) Applicant: Advanced Micro Devices, Inc., Santa Clara, CA (US)

(72) Inventors: Linwei Yu, Shanghai (CN); Yang Ling, Shanghai (CN); Jiangli Ye, Shanghai (CN)

(73) Assignee: Advanced Medical Devices, Inc., Santa Clara, CA (US)

( * ) Notice: Subject to any disclaimer, the term of this patent is extended or adjusted under 35 U.S.C. 154(b) by 0 days.

(21) Appl. No.: 17/558,459

(22) Filed: Dec. 21, 2021

(30) Foreign Application Priority Data

Dec. 13, 2021 (CN) .......................... 202111517795.X (51) Int. Cl.
  *H04N 9/64* (2006.01)
  *H04N 5/232* (2006.01)
  *H04N 9/04* (2006.01)

(52) U.S. Cl.
  CPC ........... *H04N 9/64* (2013.01); *H04N 5/23229* (2013.01); *H04N 9/0455* (2018.08); *H04N 9/04515* (2018.08)

(58) Field of Classification Search
  CPC .. H04N 9/64; H04N 5/23229; H04N 9/04515; H04N 9/0455
  See application file for complete search history.

(56) References Cited

U.S. PATENT DOCUMENTS

| 5,032,903 | A  | * | 7/1991  | Suzuki  | H04N 1/6022 358/448 |
| 5,113,248 | A  | * | 5/1992  | Hibi    | H04N 1/6022 358/501 |
| 7,653,240 | B1 | * | 1/2010  | Otobe   | G06T 3/4015 382/162 |
| 2018/0293456 | A1 | * | 10/2018 | Bredno  | G06V 10/449 |
| 2019/0259138 | A1 | * | 8/2019  | Wakazono | H04N 5/232 |
| 2022/0092814 | A1 | * | 3/2022  | Eberspach | G06T 7/521 |

* cited by examiner

*Primary Examiner* — Hung H Lam
(74) *Attorney, Agent, or Firm* — Volpe Koenig (57) ABSTRACT

Devices, methods, and systems for detecting false color in an image. An edge preserving filter is applied to an image sensor output to generate a first demosaiced image. A low pass filter is applied to the image sensor output to generate a second demosaiced image. A hue difference between the first demosaiced image and the second demosaiced image is calculated. A false color region is detected responsive to the hue difference exceeding a threshold hue difference.

20 Claims, 8 Drawing Sheets

FIG. 5 Estiamted Image

FIG. 4 CFA Image

FIG. 3 Original Image

DETECTION OF FALSE COLOR IN AN IMAGE

CROSS REFERENCE TO RELATED APPLICATION

This application claims priority to Chinese Patent Application No. 202111517795.X, filed Dec. 13, 2021, the entire contents of which is hereby incorporated by reference as if fully set forth herein.

BACKGROUND

Modern imaging devices, such as consumer digital cameras, typically generate an image by capturing light from a scene using an image sensor. The image sensor typically includes an array of photodetectors, which each generate a charge when struck by a sufficient amount of light. In a typical image sensor, each photodetector corresponds to one pixel of an image.

The photodetectors usually have little or no wavelength specificity on their own. Accordingly, to generate a color image, a mosaic of different colored filters is placed over the photodetectors of the image sensor so that different photodetectors generate current when struck by a sufficient amount of light of a corresponding wavelength. The mosaic of color filters is typically referred to as a color filter array (CFA) or color filter mosaic (CFM). One popular CFA is referred to as a Bayer filter. A Bayer filter includes red, green, and blue color filters.

Since each photodetector is typically filtered by a single color filter of the CFA (e.g., a red, green, or blue filter in the case of a Bayer filter), the data from each pixel of the raw output of the image sensor (which may be referred to as a Bayer pattern image or Bayer image in the case of a Bayer filter) does not fully specify the color of the pixel on its own. Accordingly, the Bayer image is demosaiced to generate complete color values for each pixel. The demosaicing process typically interpolates the Bayer image values of surrounding pixels to estimate a complete color value for a particular pixel in the demosaiced image.

For example, the Bayer output of a photodetector filtered by a green filter of a Bayer filter will indicate the contribution of green light to the color value of the corresponding pixel. Contributions of red and blue light to the color value of the pixel are determined based on the Bayer output of neighboring pixels filtered by corresponding red and blue filters; e.g., by interpolating the values of these pixels.

BRIEF DESCRIPTION OF THE DRAWINGS

A more detailed understanding can be had from the following description, given by way of example in conjunction with the accompanying drawings wherein.

DETAILED DESCRIPTION

Devices, methods, and systems for detecting false color in an image. An edge preserving filter is applied to an image sensor output to generate a first demosaiced image. A low pass filter is applied to the image sensor output to generate a second demosaiced image. A hue difference between the first demosaiced image and the second demosaiced image is calculated. A false color region is detected responsive to the hue difference exceeding a threshold hue difference.

Figure 1:
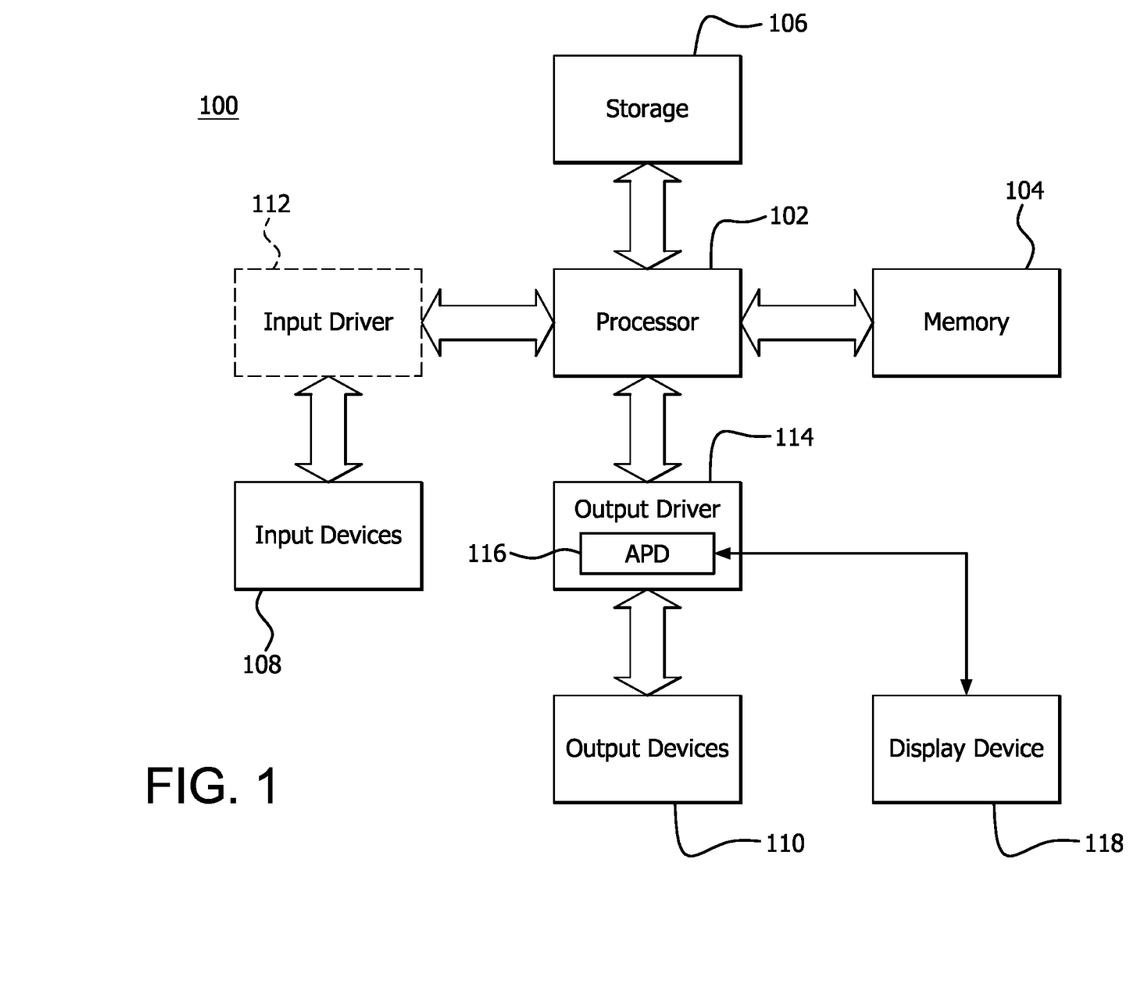
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm can also perform the functionality described herein.

Figure 2:
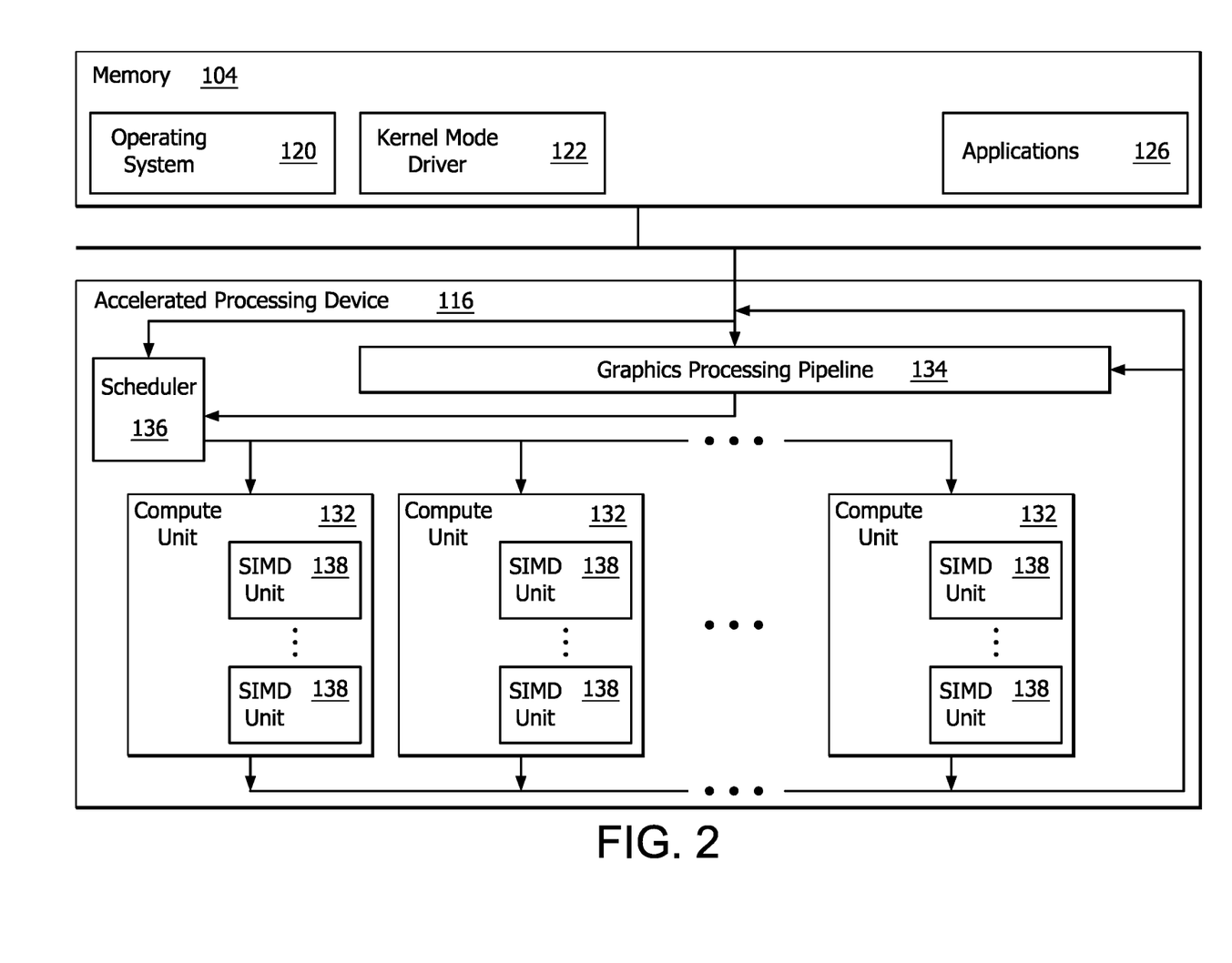
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are or can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with or using different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Simple interpolative demosaicing approaches often produce an acceptable image of the subject in image areas with smooth gradients. More detailed, higher resolution, or high frequency areas of an image, e.g., close to the resolution of the image sensor, can produce a result which does not look like the subject. One typical problem is false color, where the demosaiced output does not accurately depict the color of the subject. False color may include speckle color noise and/or color Moiré, for example.

Figure 3:
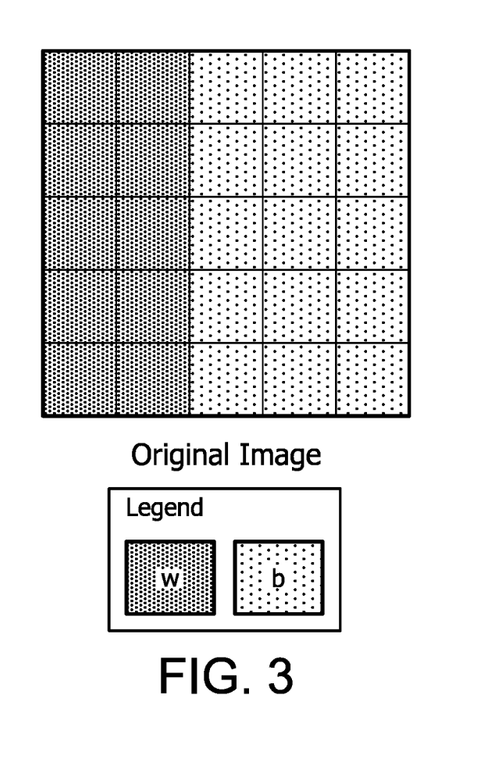
FIG. 3 is a block diagram illustrating an example original image.
Figure 4:
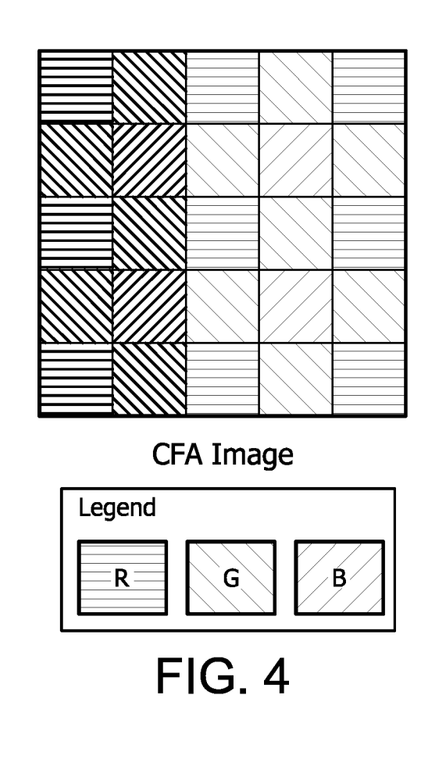
FIG. 4 is a block diagram illustrating raw output of an image sensor, based on the original image of FIG. 3.
Figure 5:
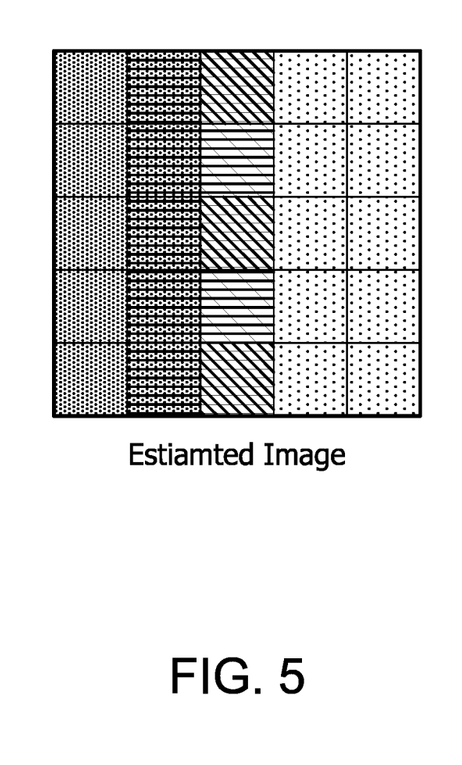
FIG. 5 is a block diagram illustrating a demosaiced version of the Bayer image of FIG. 4.

FIG. 3 is a block diagram illustrating an example original image which includes a 2×5 vertical black line and a 3×5 vertical white line. It is noted that the transition between the black area and white area of this image is a high frequency feature of the image. FIG. 4 is a block diagram illustrating raw output of an image sensor, which includes a CFA, after the original image is captured by the image sensor. In this example, the CFA is a Bayer filter, and the output image is a Bayer image. Here, each pixel includes color information corresponding to only one filter color of the CFA). FIG. 5 is a block diagram illustrating a demosaiced version of the Bayer image of FIG. 4. The demosaiced image shows false color effects along the border between the black line and white line which, in this example, are attributable to the high frequency nature of this feature of the image.

Some approaches to detecting false colors in a demosaiced image include comparing the color value of a pixel with sorted color values in a window, using a threshold. Such sorted-filter-based approaches may not be able to resolve color Moiré. Some approaches to detecting false colors in a demosaiced image include classifying false color regions using color saturation thresholds. Such approaches typically detect a color throughout the entire demosaiced image, and may not provide accurate detection results. Such approaches are performed on a demosaiced image, as a post-demosaic process.

It may be desired to provide false color detection which corrects for false color, e.g., including speckle color noise and/or color Moiré. It may be desired for such false color detection to be based on the output of the image sensor (e.g., Bayer image).

Figure 6:
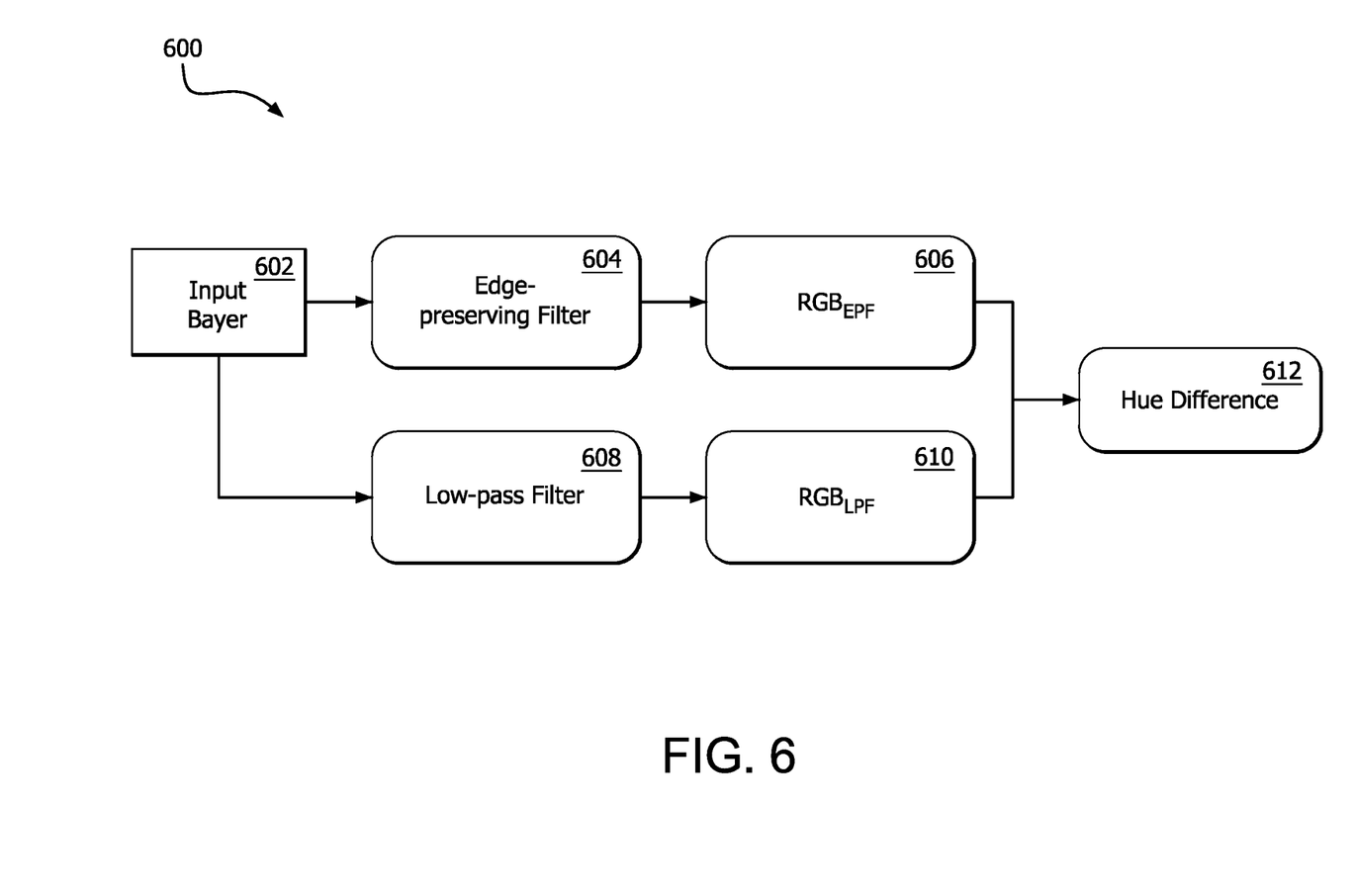
FIG. 6 is flow chart illustrating an example method for detecting false color in a pixel.

FIG. 6 is a flow chart illustrating an example method 600 for detecting false color in a pixel. In this example, input Bayer image 602 is the raw output of an image sensor, which includes a CFA, after the original image is captured by the image sensor. In this example, the CFA is a Bayer filter, and the output image is a Bayer image. It is noted that a Bayer filter and Bayer image are only examples, and that any suitable CFA and image sensor output format is usable in other implementations.

The Bayer image 602 (or other image sensor output based on a non-Bayer CFA in other implementations) is input to a first filter 604. The first filter 604 includes an edge preserving filter in this example, such as a local linear model interpolation filter and/or other suitable filter. First filter 604 interpolates each pixel of the Bayer image 602 and outputs full resolution color demosaiced image 606.

The first filter 604 is applied to each pixel location to interpolate all missing color components for that pixel $R_{EPF}$, $G_{EPF}$, $B_{EPF}$. Thus, in some implementations, each pixel of demosaiced image 606 is represented as an RGB color triplet. Accordingly, demosaiced image 606 is referred to as $RGB_{EPF}$ in the figure, reflecting that, in this example, it is a demosaiced Bayer image that has been subject to an edge preserving filter.

The Bayer image 602 (or other image sensor output based on a non-Bayer CFA in other implementations) is input to a second filter 608. The second filter 608 includes a low-pass filter in this example, such as an averaging filter and/or other suitable filter. Second filter 608 interpolates each pixel of the Bayer image 602 and outputs full resolution color demosaiced image 610.

The second filter 608 is applied to each pixel location to interpolate all missing color components for that pixel $R_{LPF}$, $G_{LPF}$, $B_{LPF}$. Thus, in some implementations, each pixel of demosaiced image 610 is represented as an RGB color triplet. Accordingly, demosaiced image 610 is referred to as $RGB_{LPF}$ in the figure, reflecting that, in this example, it is a demosaiced Bayer image that has been subject to a low pass filter. In some implementations, each pixel of demosaiced image 610 is represented as an RGB color triplet.

After demosaiced image 606 and demosaiced image 610 are available, a hue difference 612 is calculated between demosaiced image 606 and demosaiced image 610 for each pixel.

Figure 7:
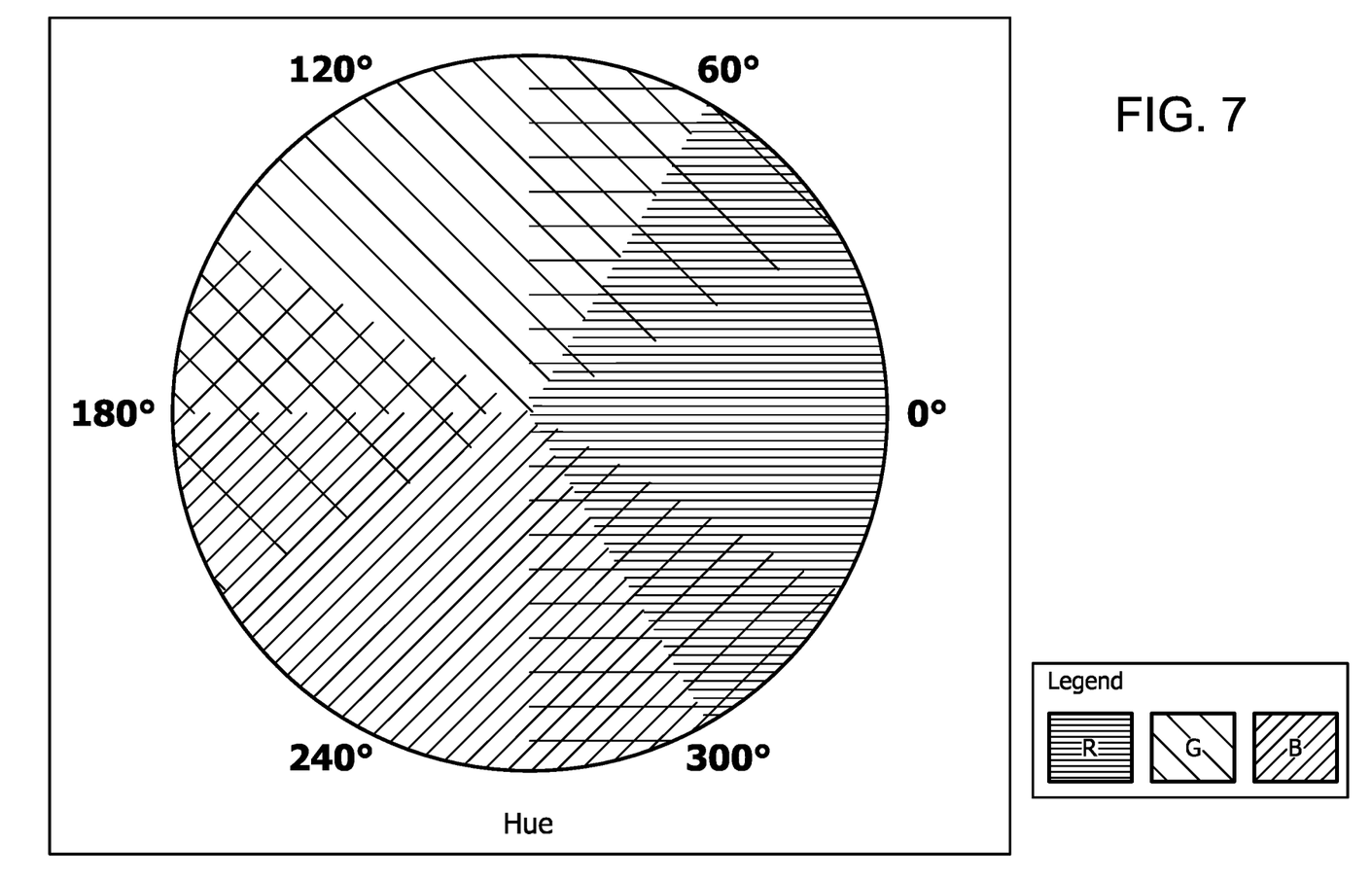
FIG. 7 is a color wheel illustrating representation of hue by an angle.

In some implementations, a hue is calculated for each pixel based on the color triplet. A hue for a pixel having a color represented by $R_{EPF}$, $G_{EPF}$, $B_{EPF}$ is referred to as $H_{EPF}$. Hue values are typically represented in terms of degrees of a color wheel, as shown in FIG. 7, however, the hue can be represented in any suitable manner. A hue for a pixel having a color represented by $R_{LPF}$, $G_{LPF}$, $B_{LPF}$ is referred to as $H_{LPF}$. Thus, a hue difference $\Delta H$ can be calculated as:

$$\Delta H = \min(\text{abs}(H_{EPF} - H_{LPF}), 360 - \text{abs}(H_{EPF} - H_{LPF})) \quad \text{Eq. 1}$$

Whether or not a pixel will demosaic to a false color is determined based on the Hue difference $\Delta H$ between the demosaiced image 606 and demosaiced image 610. For example, in some implementations, a greater difference between hues indicates a greater probability P that the pixel will demosaic to a false color. Thus, in some implementations, a probability of false color probability P for each pixel is determined based on the magnitude of the difference in the hue of each pixel between demosaiced image 606 and demosaiced image 610, e.g., as calculated in Eq. 1.

Figure 8:
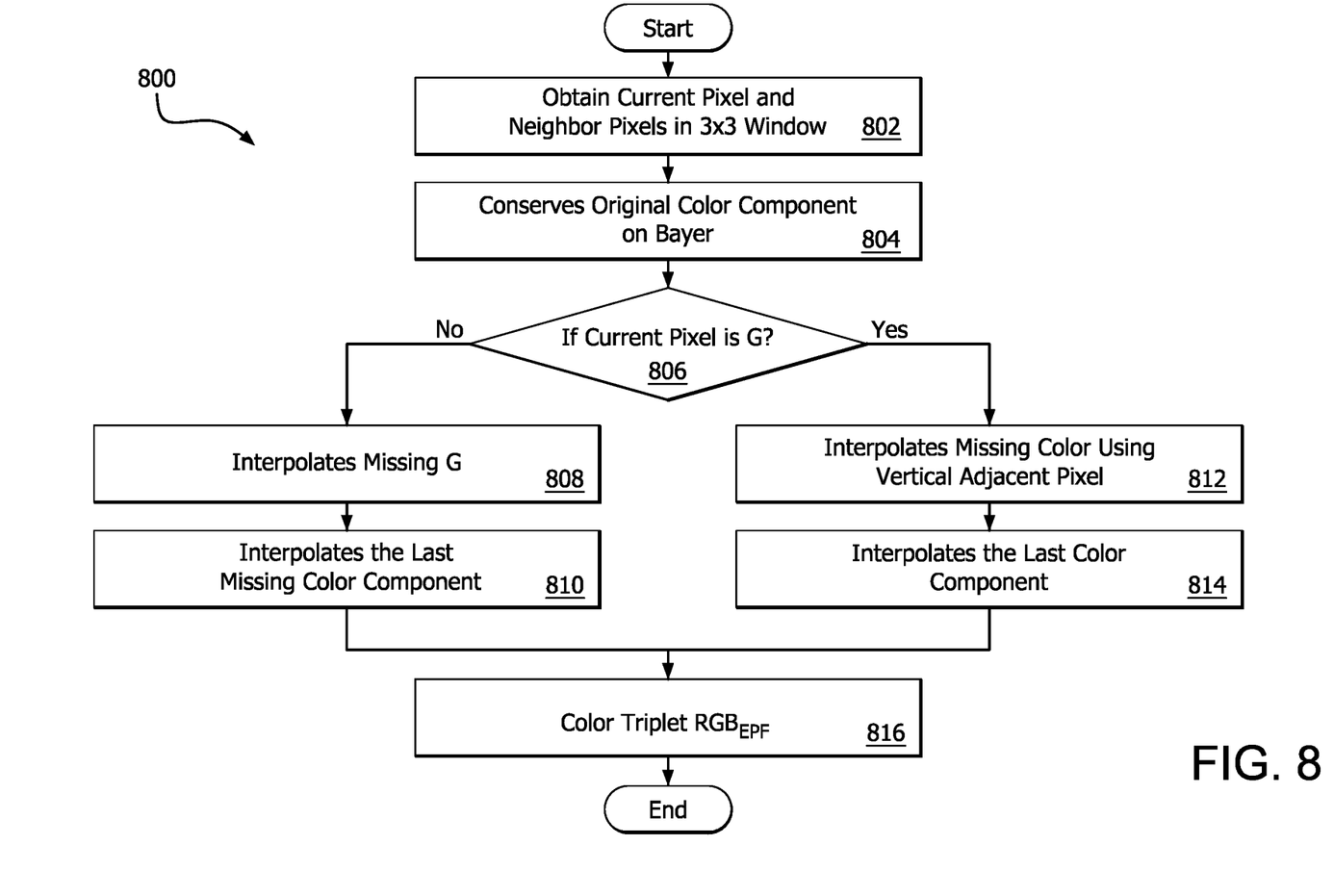
FIG. 8 is a flow chart illustrating an example edge preserving filter process.

FIG. 8 is a flow chart illustrating an example edge preserving filter process 800 for determining a color triplet $RGB_{EPF}$ of a pixel. Process 800 can be used, for example, for second filter 604 as shown and described with respect to FIG. 6.

In step 802, edge preserving interpolator inputs the Bayer image (or other image sensor output based on a non-Bayer CFA in other implementations) color component for a pixel, and the color components for its neighbor pixels in a 3×3 window of pixels. It is noted that the window size and interpolation calculations are an example, and other window sizes and interpolation calculations are used in other implementations. In step 804, the original Bayer image color component of the pixel is stored. On condition 806 that the pixel is not a green pixel the missing green color component is interpolated in step 808 by applying a filter EPF1 to the green components of the neighbor pixels. Conditioning the first calculation on green, as opposed to another color here is only an example implementation. Other implementations start with other colors or apply the edge preserving filter or filters in a different way.

$$EPF1 = \begin{bmatrix} 1 \\ 0 \\ 1 \end{bmatrix} / 2 \quad \text{Eq. 2}$$

In step 810, the remaining missing color component (i.e., blue if the pixel is red, or red if the pixel is blue) is interpolated by applying a filter EPF2 to that component of the neighbor pixels:

$$EPF2 = \begin{bmatrix} 1 & 0 & 1 \\ 0 & 0 & 0 \\ 1 & 0 & 1 \end{bmatrix} / 4 \quad \text{Eq. 3}$$

and applying a filter EPF3 to the green components of the neighbor pixels:

$$EPF3 = \begin{bmatrix} 0 & 1 & 0 \\ -1 & 0 & -1 \\ 0 & 1 & 0 \end{bmatrix} / 4 \quad \text{Eq. 4}$$

The filtered outputs are added in step 816 to obtain color triplet $RGB_{EPF}$ of the pixel.

On the other hand, on condition 806 that the pixel is a green pixel the first missing color component (e.g., blue) is interpolated in step 812 by applying a filter EPF4 to the vertical adjacent component of the current pixel.

$$EPF4 = \begin{bmatrix} 1 \\ 0 \\ 1 \end{bmatrix} / 2 \quad \text{Eq. 5}$$

In step 814, the remaining missing color component (e.g., red) is interpolated by applying a filter EPF5 to that component of the neighbor pixels $$EPF5 = [1\ 0\ 1]/2 \qquad \text{Eq. 6}$$

Applying a filter EPF6 to the green components of the neighbor pixels:

$$EPF6 = \begin{bmatrix} -1 & 0 & -1 \\ 0 & 4 & 0 \\ -1 & 0 & -1 \end{bmatrix} / 4 \qquad \text{Eq. 7}$$

The filtered outputs are added in step 816 to obtain color triplet $RGB_{EPF}$ of the pixel.

Figure 9:
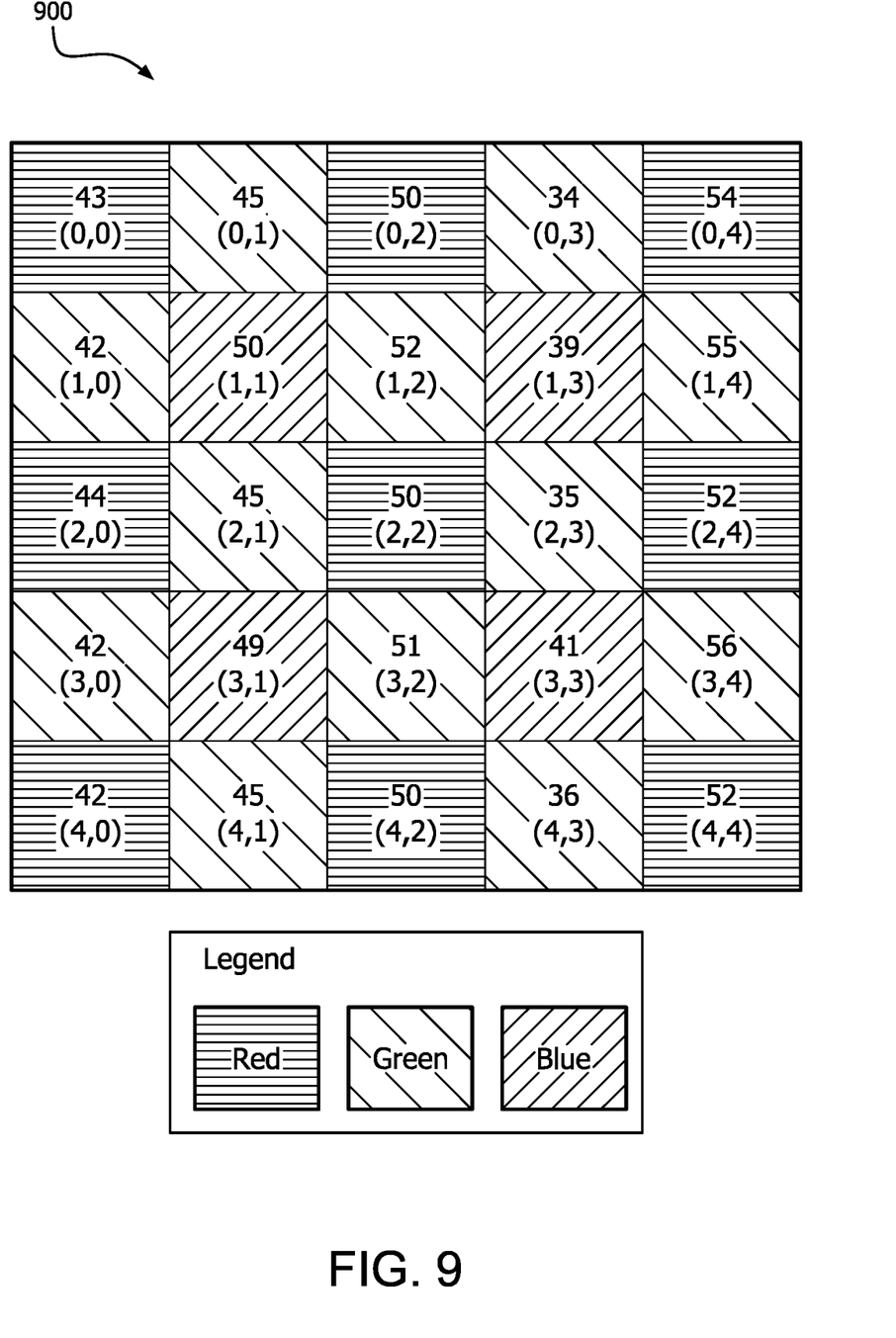
FIG. 9 is a block diagram of a core window of Bayer image pixels.

FIG. 9 is a block diagram of a 5×5 core window 900 of Bayer image pixels centered on pixel 2,2. Each of the pixels in core window 900 indicates a single color component. For example, pixel 2,2 indicates a red component value of 50 in this example. Thus, R(2,2)=50, G(2,2)=0, B(2,2)=0.

Applying the edge preserving filter process 800 described with respect to FIG. 8 to the 5×5 core window 900 yields the following:

Step 804: $R_{EPF}$ (2,2)=R(2,2)=50
Step 808: $G_{EPF}$ (2,2)=round((G(1,2)*1+G(2,2)*0+G(3,2)*1)/2)=52
Step 810: $B_{EPF}$ (2,2)=(B(1,1)+B(1,3)+B(3,1)+B(3,3))/4+ (G(1,2)+G(3,2)−G(2,1)−G(2,3))/4=46+6=52
Step 816: $RGB_{EPF}$(2,2)=(50,52,52)

In order to calculate $RGB_{LPF}$ for pixel 2,2, a low-pass filter interpolates missing color components using, weighted averaging, for example, but not limited to:

$$LPF_G = \begin{bmatrix} 2 & 7 & 11 & 7 & 2 \\ 7 & 32 & 50 & 32 & 7 \\ 11 & 50 & 76 & 50 & 11 \\ 7 & 32 & 50 & 32 & 7 \\ 2 & 7 & 11 & 7 & 2 \end{bmatrix} / 256 \qquad \text{Eq. 8}$$

$$LPF_{RB} = \begin{bmatrix} 2 & 7 & 11 & 7 & 2 \\ 7 & 32 & 50 & 32 & 7 \\ 11 & 50 & 76 & 50 & 11 \\ 7 & 32 & 50 & 32 & 7 \\ 2 & 7 & 11 & 7 & 2 \end{bmatrix} / 128 \qquad \text{Eq. 9}$$

Applying $LPF_G$ to the green components of the core window gives the calculated $G_{LPF}$ value:

$$\begin{aligned}
G_{LPF}(2,2) = \text{round}(&(G(0,0)^*2 + G(0,1)^*7 + G(0,2)^*11 + G(0,3)^*7 + G(0,4)^*2 + \\
& G(1,0)^*7 + G(1,1)^*32 + G(1,2)^*50 + G(1,3)^*32 + G(1,4)^*7 + \\
& G(2,0)^*11 + G(2,1)^*50 + G(2,2)^*76 + G(2,3)^*50 + G(2,4)^*11 + \\
& G(3,0)^*7 + G(3,1)^*32 + G(3,2)^*50 + G(3,3)^*32 + G(3,4)^*7 + \\
& G(4,0)^*2 + G(4,1)^*7 + G(4,2)^*11 + G(4,3)^*7 + G(4,4)^*2)/256) \\
= \text{round}(&(0^*2 + 45^*7 + 0^*11 + 34^*7 + 0^*2 + \\
& 42^*7 + 0^*32 + 52^*50 + 0^*32 + 55^*7 + \\
& 0^*7 + 45^*32 + 0^*50 + 35^*32 + 0^*7 + \\
& 42^*7 + 0^*32 + 51^*50 + 0^*32 + 56^*7 + \\
& 0^*7 + 45^*32 + 0^*50 + 36^*32 + 0^*7)/256) \\
= 47&
\end{aligned} \qquad \text{Eq. 10}$$

Similarly, applying $LP_{FRB}$ to red components in core window gives $R_{LPF}$(2,2)=50, and applying $LP_{FRB}$ to red components in core window gives $B_{LPF}$(2,2)=45. Thus, the triplet color components for pixel 2,2 are $RGB_{LPF}$(2,2)=(50, 47,45) in this example.

The triplet colors can be converted to color hue in any suitable manner, such as the following:

TABLE 1

| Ordering | Hue Region | Hue in degrees |
|---|---|---|
| R ≥ G ≥ B | Orange | $60° \cdot \dfrac{G-B}{R-B}$ |
| G > R ≥ B | Chartreuse | $60° \cdot \left(2 - \dfrac{R-B}{G-B}\right)$ |
| G ≥ B > R | Spring Green | $60° \cdot \left(2 + \dfrac{B-R}{G-R}\right)$ |
| B > G > R | Azure | $60° \cdot \left(4 - \dfrac{G-R}{B-R}\right)$ |
| B > R ≥ G | Violet | $60° \cdot \left(4 + \dfrac{R-G}{B-G}\right)$ |
| R ≥ B > G | Rose | $60° \cdot \left(6 - \dfrac{B-G}{R-G}\right)$ |

Applying these formulas to compute $RGB_{EPF}$ and $RGB_{LPF}$:

$$B_{EPF} = G_{EPF} > R_{EPF}, \text{ thus, } H_{EPF} = 60 \times (4 - ((52-50)/(52-50))) = 180° \qquad \text{Eq. 11}$$

$$R_{LPF} > G_{LPF} > B_{LPF}, \text{ thus, } H_{LPF} = 60 \times (4 - ((47-45)/(50-45))) = 24° \qquad \text{Eq. 12}$$

and applying Eq. 1:

$$\begin{aligned}
\Delta H &= \min(\text{abs}(H_{EPF} - H_{LPF}), 360\text{-abs}(H_{EPF} - H_{LPF})) \\
&= \min(156°, 360 - 156°) \\
&= 156°
\end{aligned} \qquad \text{Eq. 13}$$

After the hue difference ΔH is known, the probability that the demosaiced pixel will exhibit a false color is determined. In some implementations, the magnitude of ΔH is simply compared with a threshold to determine whether the demosaiced pixel will exhibit a false color. For example, if 156° exceeds the threshold, then it will be determined that pixel (2,2) discussed above will exhibit a false color when demosaiced.

In other implementations, a probability that the demosaiced pixel will exhibit a false color is assigned to the pixel based on the magnitude of ΔH. In some implementations, a threshold can be applied in order to filter out noise.

Figure 10:
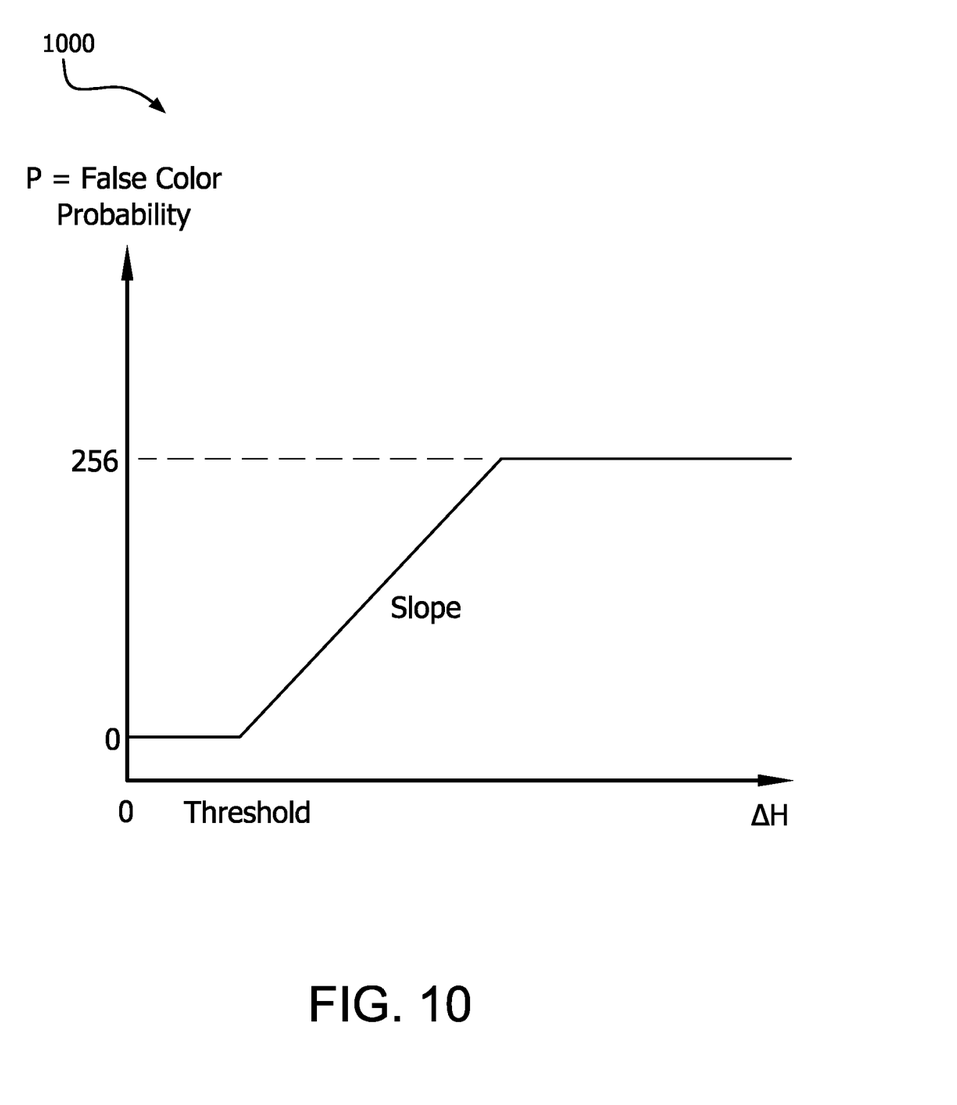
FIG. 10 is a line graph illustrating an example function curve for determining false color probability based on hue difference.

FIG. 10 is a line graph illustrating an example function curve 1000 for determining false color probability P based on hue difference ΔH. In this example, slope and threshold are parameters which can be used to tune curve 1000. The probability can be determined as follows:

If: $\Delta H <= \text{threshold}: P = 0$       Eq. 14

Else: $P = \max(256, (\Delta H - \text{threshold}) * \text{slope})$      Eq. 15

In the example curve 1000, the current pixel location has a 0% probability to be false color region for ΔH=0, and has 100% probability to be a false color region at ΔH=256 and above. Here, if ΔH=0, the current pixel location has a 0% probability to be false color region. If ΔH=256, the current pixel location has 100% probability to be a false color region. If the slope takes value of 2, and threshold takes 2, for example, applying Eq. 15:

$P(2,2) = \max(256, (156-2)*2) = \max(256, 308) = 256$      Eq. 16

Here, pixel (2,2) is detected as a false color region with 100% probability.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device configured to detect false color in an image, the device comprising:
   circuitry configured to apply an edge preserving filter to an image sensor output to generate a first demosaiced image;
   circuitry configured to apply a low pass filter to the image sensor output to generate a second demosaiced image;
   circuitry configured to calculate a hue difference between the first demosaiced image and the second demosaiced image; and
   circuitry configured to detect a false color region responsive to the hue difference exceeding a threshold hue difference.

2. The device as in claim 1, wherein the image sensor output comprises a Bayer image.

3. The device as in claim 1, wherein the image sensor comprises a color filter array.

4. The device as in claim 1, wherein the edge preserving filter comprises a local linear model interpolation.

5. The device as in claim 1, wherein the low pass filter comprises an averaging interpolation.

6. The device as in claim 1, wherein applying the edge preserving filter to the image sensor output further comprises applying a filter to neighboring pixels in a core window surrounding a pixel to determine a color value for the pixel.

7. The device as in claim 1, wherein applying the low pass filter to the image sensor output further comprises determining a weighted average of neighboring pixels in a core window surrounding a pixel to determine a color value for the pixel.

8. The device as in claim 1, wherein the first demosaiced image and the second demosaiced image comprise color triplets.

9. A method for detecting false color in an image, the method comprising:
   applying an edge preserving filter to an image sensor output to generate a first demosaiced image;
   applying a low pass filter to the image sensor output to generate a second demosaiced image;
   calculating a hue difference between the first demosaiced image and the second demosaiced image; and
   detecting a false color region responsive to the hue difference exceeding a threshold hue difference.

10. The method as in claim 9, wherein the image sensor comprises a color filter array.

11. The method as in claim 9, wherein the edge preserving filter comprises a local linear model interpolation.

12. The method as in claim 9, wherein the low pass filter comprises an averaging interpolation.

13. The method as in claim 9, wherein applying the edge preserving filter to the image sensor output further comprises applying a filter to neighboring pixels in a core window surrounding a pixel to determine a color value for the pixel.

14. The method as in claim 9, wherein applying the low pass filter to the image sensor output further comprises determining a weighted average of neighboring pixels in a core window surrounding a pixel to determine a color value for the pixel.

15. The method as in claim 9, wherein the first demosaiced image and the second demosaiced image comprise color triplets.

16. The method as in claim 9, wherein the image sensor output comprises a Bayer image.

17. A non-transitory computer readable medium having instructions thereon which when executed by a processor cause the processor to: apply an edge preserving filter to an image sensor output to generate a first demosaiced image; apply a low pass filter to the image sensor output to generate a second demosaiced image; calculate a hue difference between the first demosaiced image and the second demosaiced image; and detect a false color region responsive to the hue difference exceeding a threshold hue difference.

18. The non-transitory computer readable medium as in claim 17, wherein the image sensor output comprises a Bayer image.

19. The non-transitory computer readable medium as in claim 17, wherein the edge preserving filter comprises a local linear model interpolation.

20. The non-transitory computer readable medium as in claim 17, wherein the low pass filter comprises an averaging interpolation.

\* \* \* \* \*